Figure 1:
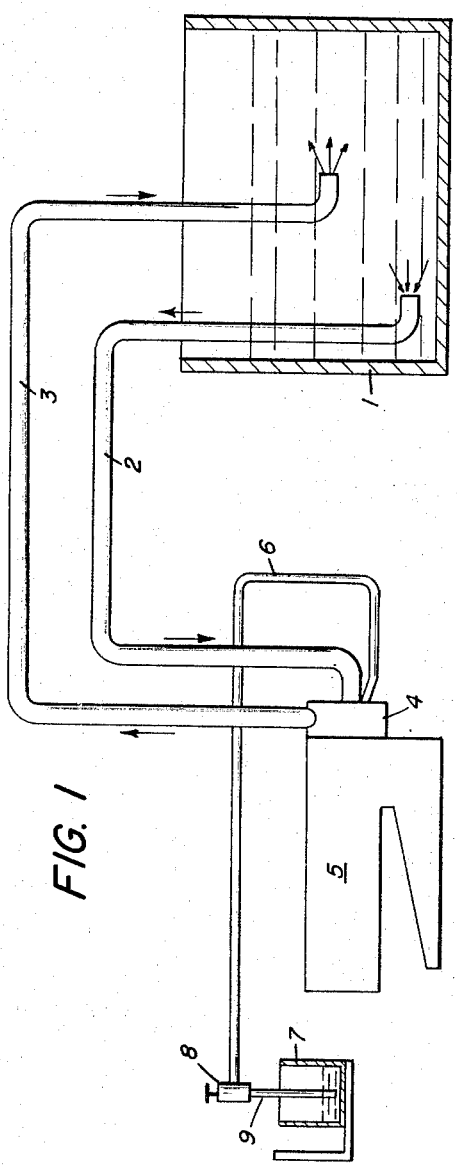

Sept. 19, 1967

F. C. McCROSSEN ET AL
INCORPORATION OF CERTAIN ADDENDA INTO
AQUEOUS GELATIN SOLUTIONS
Filed Oct. 7, 1963

3,342,605

FRED C. McCROSSEN
JAMES M. OWENS
INVENTORS

BY

ATTORNEYS 3,342,605
INCORPORATION OF CERTAIN ADDENDA INTO AQUEOUS GELATIN SOLUTIONS
Fred C. McCrossen and James M. Owens, Rochester, N.Y., assignors to Eastman Kodak Company, Rochester, N.Y., a corporation of New Jersey
Filed Oct. 7, 1963, Ser. No. 314,314
5 Claims. (Cl. 96—94)

This invention relates to a method of incorporating into gelatin solutions, solutions of addenda which are prone to cause the formation of coagulated particles therein, characterized in that the gelatin solution is recirculated by a centrifugal pump having a small additional intake port located near the center of the impeller of the pump.

In the photographic art it is frequently necessary to add various types of solutions to aqueous gelatin solutions especially to gelatin-silver halide photographic emulsions. These addenda are ordinarily added in the form of their solutions. For instance, sensitizing dyes and antifoggants are commonly added in the form of their solutions in organic solvents. The solvents are prone to cause formation of coagulated particles in the gelatin solutions. Hardeners are commonly added to gelatin solutions in the form of their aqueous solutions. Temporary high concentrations of hardeners may cause over-hardening of a portion of the gelatin giving an undesirable effect. It is often desirable to add acid to gelatin solutions particularly photographic emulsions to impart a desired pH. Sometimes such gelatin solutions contain gelatin derivatives which are sensitive to a decidedly acid pH; hence, unless care is used in the addition of the acid or alkali to the gelatin solution some precipitation of gelatin may occur.

It has been noted that often when the addition of one or more of these addenda compositions to gelatin solutions makes for areas having a local high concentration of the solution which results in coagulated particles. These coagulated particles of gelatin by plugging filters interfere with filtration of the gelatin solution. Also the presence of these particles may increase the occurrence of defects in the coatings which result therefrom. These coating defects may be evidenced when the gelatin composition is applied to a support such as a single layer or when several such compositions are applied simultaneously in a multi-layer application.

One object of our invention is to provide a procedure for incorporating various addenda into gelatin solutions without appreciable formation of coagulated gelatin particles therein. Another object of our invention is to provide gelatin coating compositions having good filtering and coating properties. A further object of our invention is to provide a means of incorporating into gelatin solutions, solutions which are prone to cause the formation of coagulated gelatin particles. A still further object of our invention is to provide a method of incorporating addenda into gelatin solutions particularly gelatin-silver halide emulsions utilizing a centrifugal pump. Other objects of our invention will appear herein.

Various methods of incorporating addenda solutions into gelatin solutions or silver halide-gelatin solutions have been described but when these methods are used gelatin particles tend to form and coatings prepared using numerous such solutions have exhibited coating defects. We have found that coating defects are reduced to a minimum and filterability of the gelatin solution is good if the addendum solution is added continuously to a gelatin solution at a constant rate of flow by means of a centrifugal pump, the impeller of which rotates at a speed of at least 750 r.p.m., the gelatin solution being added to the centrifugal pump at a rate of intake of at least 15 times that of the addendum solution which is being supplied.

Figure 2:
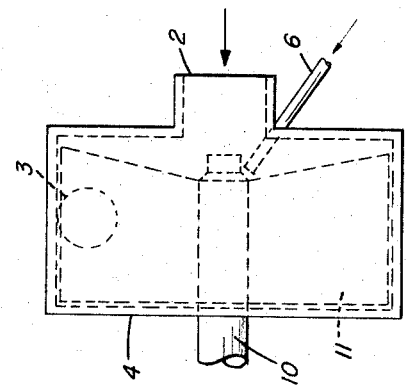

The accompanying drawing (FIG. 1) illustrates the processing of gelatin solutions or gelatin-silver halide emulsions in accordance with our invention. FIGURE 1 shows schematically the connecting of the centrifugal pump with the gelatin solution and with the source of supply of the addenda solution. FIGURE 2 is a view in section of the interior of the centrifugal pump which is provided with a main feed to supply the gelatin solution and an auxiliary feed to supply the addenda solution thereto.

Referring to the drawing, the gelatin solution is contained in a vessel or tank, 1, which preferably is fitted with a heating means, not shown, to keep the gelatin solution in liquid condition. Leading from the bottom portion of the tank is a pipe 2 which connects to the central portion of centrifugal pump 4. Leading from the outer periphery of the centrifugal pump is pipe 3 which returns the gelatin solution to the reservoir or tank 1 in which the gelatin solution is kept liquid. The centrifugal pump 4 resembles in general outline the well-known centrifugal pumps having an impeller as illustrated by 11 of FIGURE 2. An electrical motor 5 (or some other means) is supplied for rotating the impeller of the centrifugal pump at the rate of at least 750 r.p.m. Also entering the centrifugal pump at the center of the impeller is auxiliary feed 6 of more restricted diameter than pipes 2 and 3. This feed is connected to container 7 through regulating valve 8 and wand 9. In operation. vessel 7 is kept supplied with an addendum solution. The rate at which that solution is transmitted to the centrifugal pump is regulated by means of valve 8. The addendum solution is transmitted to the centrifugal pump by virtue of the suction obtained through its operation.

The centrifugal pump proper is illustrated by FIG. 2. This pump comprises an impeller 11 rotated within the casing 4 by axle 10 which is rotated by a motor or some other driving means.

The method in accordance with our invention involves liquefying the gelatin solution or photographic emulsion in chamber 1 and setting in motion the centrifugal pump 4 thereby sucking the gelatin solution from tank 1 through tube 2 and the addendum solution from source 7 through tube 6 all at a controlled rate. The intake of gelatin solution and of the addendum solution into the centrifugal pump is so adjusted that the gelatin solution is supplied at a rate at least 15 times and preferably 30 to 50 times that at which the addendum solution is being supplied. In view of the valve arrangement no more than a limited amount of air is introduced into the system thereby inhibiting foaming even at the very high turbulences provided by the impeller of the centrifugal pump at the point of mixing.

Some of the addenda which may be added to gelatin solutions especially those in the form of gelatin-silver halides are antifoggants particularly of the azole type such as the tetrazoles, thiazoles, oxazoles, selenazoles and the like. These antifoggants are commonly added to photographic emulsions in the form of their solutions in an organic solvent. The various sensitizing dyes are mainly used in the form of their solutions in a commonly known organic solvent such as for example a cyanine sensitizing dye in methanol solution of merocyanine dye in acetone solution. Gelatin hardeners are ordinarily incorporated into the aqueous gelatin in the form of their aqueous solutions. Some hardeners which are recognized as useful in gelatin solutions or gelatin-containing photographic solutions are certain aldehydes such as formaldehyde, mucochloric acid, succinaldehyde, glutaraldehyde, and the like. Other hardeners which have been suggested for hardening photographic gelatin in compositions thereof the bisaziridines, the bismaleimides, the dialdehydrocarbohydrates and the like.

Our invention is useful in incorporating addenda into gelatin solutions and particularly into gelatin-silver halide photographic emulsions. This procedure admits of adding ingredients to the various types of silver halide emulsions such as of the silver chlorobromide type, the silver bromoiodide type, etc. Our process may be used for supplying addenda to all types of fine grain and coarse grain gelatin photographic emulsions including color emulsions, black and white emulsions, X-ray emulsions and the like. For example, high speed sulfur-gold sensitized gelatin-silver halide photographic emulsions, in which addenda are incorporated by procedures in accordance with our invention, are conveniently prepared for coating operations.

The following example illustrates our invention:

A silver bromoiodide gelatin photographic emulsion designed for use as the green-sensitive layer of a multicolor film was prepared containing suspended silver halide in a solution of 5% gelatin in water. About 400 pounds of this emulsion was melted in a large kettle containing a conventional stirrer at a temperature of about 120° F. There was added to this emulsion in that order by the procedure in accordance with our invention the following addenda: (1) a methanol solution of a cyanine dye in the amount of 600 cc. per pound of emulsion, (2) a solution in acetone of an azole antifoggant in an amount of 9 cc. per pound of emulsion and (3) an aqueous solution of an aldehyde hardener in the amount of 3 cc. per pound of emulsion. These addenda were incorporated in the emulsion using the apparatus illustrated in FIG. 1 of the drawings under the following conditions:

| | |
|---|---|
| Temperature ° F | 120 |
| Emulsion flow rate pounds per minute | 120 |
| Addenda flow rate do | 4 |
| Pump impeller diameter inches [1] | 5⅞ |
| Pump H.P. | 2 |
| Addenda orifice inches (approx.) | 3/16 |

[1] Rotating at 1750 r.p.m.

Another 400 pounds of the emulsion referred to was melted in a large kettle containing a conventional stirrer by heating to about 120° F. A methanol solution of cyanine sensitizing dye was added at the ratio of 60 cc. per pound of emulsion through an orifice onto the surface of the liquid emulsion while it was being stirred. In a similar manner an acetone solution of azole antifoggant was added at the rate of 9 cc. per pound of emulsion and an aqueous solution of aldehyde hardener was added at the rate of 3 cc. per pound of emulsion. The sensitizing dye, antifoggant and hardener solutions added were like those added in the previous run. The two emulsions obtained were filtered and coated. Properties of the two emulsions, one prepared in accordance with the invention and the other by the normal method of addition were observed as follows:

| Method of Addition | Average time to filter 500 lbs. of liquid emul. (min.) | Defect Index |
|---|---|---|
| Normal method of addition in which the addenda solution is added to the surface of the emulsion while the emulsion is stirred | 33 | 3 |
| Addenda solutions added through a centrifugal pump, in accordance with the invention | 9½ | 1 |

In another comparison of similar type gelatin silver halide emulsion melts in which in one case the addenda were added in the normal manner and in the other case the addenda were added in accordance with the invention, it was noted that the improvement in coating defects by the invention was 10 times that obtained using the normal method of addition, that is the coating defects were 1/10 as many in the photographic emulsion coating in which the invention had been employed.

Coating defects of photographic emulsions are determined by applying the emulsion as a photographic layer onto a support, exposing the photographic product thus obtained to produce a medium density, processing, and inspecting the processed coating for the number of defects per unit area (such as 1 square foot).

We claim:

1. A method of incorporating into gelatin solutions, solutions of addenda prone to cause the formation of coagulated particles therein, said method being characterized by simultaneously supplying separate flows of the gelatin solution and the addenda solution to a common junction point where they are instantly subjected to violent intermixing upon coming in contact whereby a mixture is obtained without any substantial formation of coagulated gelatin particles, and wherein the rate of flow of the gelatin solution is at least 15 times that of the addenda solution.

2. A method of incorporating into gelatin-silver halide photographic emulsions, solutions of addenda prone to cause the formation of coagulated particles therein, said method being characterized by simultaneously supplying separate flows of the photographic emulsion and the addenda solution to a common junction point where they are instantly subjected to violent intermixing upon coming in contact whereby a mixture is obtained without any substantial formation of coagulated gelatin particles, and wherein the rate of flow of the photographic emulsion is at least 15 times that of the addenda solution.

3. A method of incorporating into gelatin solutions, hardeners which comprises simultaneously supplying separate flows of gelatin solution and hardener solution to a common junction point where they are instantly subjected to violent intermixing upon coming in contact whereby a mixture is obtained without any substantial formation of coagulated gelatin particles, and wherein the rate of flow of the gelatin solution is at least 15 times that of the hardener solution.

4. A method of incorporating into gelatin solutions, sensitizing dyes which comprises simultaneously supplying separate flows of gelatin solution and sensitizing dye solution to a common junction point where they are instantly subjected to violent intermixing upon coming in contact whereby a mixture is obtained without any substantial formation of coagulated gelatin particles, and wherein the rate of flow of the gelatin solution is at least 15 times than of the sensitizing dye solution.

5. A method of incorporating into gelatin solutions, antifoggants which comprises simultaneously supplying separate flows of gelatin solution and antifoggant solution to a common junction point where they are instantly subjected to violent intermixing upon coming in contact whereby a mixture is obtained without any substantial formation of coagulated gelatin particles, and wherein the rate of flow of the gelatin solution is at least 15 times that of the antifoggant solution.

References Cited

UNITED STATES PATENTS

| | | | |
|---|---|---|---|
| 1,683,500 | 9/1928 | Thordarson | 259—9 |
| 2,245,632 | 6/1941 | Winkler | 259—9 |
| 2,322,027 | 6/1943 | Jelley et al. | 96—94 |
| 2,422,194 | 6/1947 | Harrington | 99—21 |
| 2,996,287 | 8/1961 | Audran | 96—94 |

OTHER REFERENCES

Ser. No. 392,580 (abandoned), Mercier (A.P.C.), published June 8, 1943.

J. TRAVIS BROWN, *Primary Examiner*.